Inventors:
Martin Mueller
Carl Byrd and
Rodney E. Ludder
By Dressler, Goldsmith
Clement & Gordon
Attys.

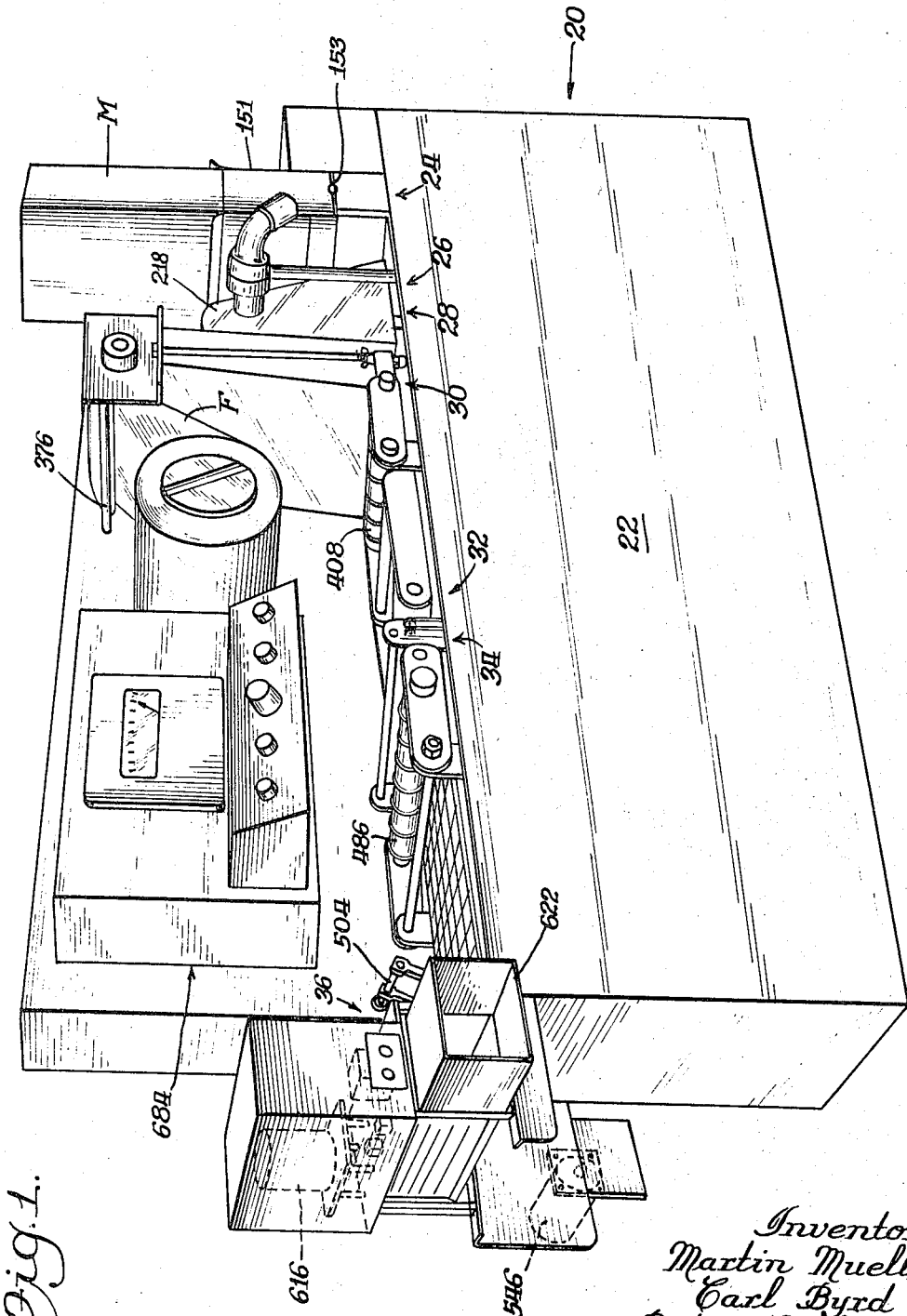

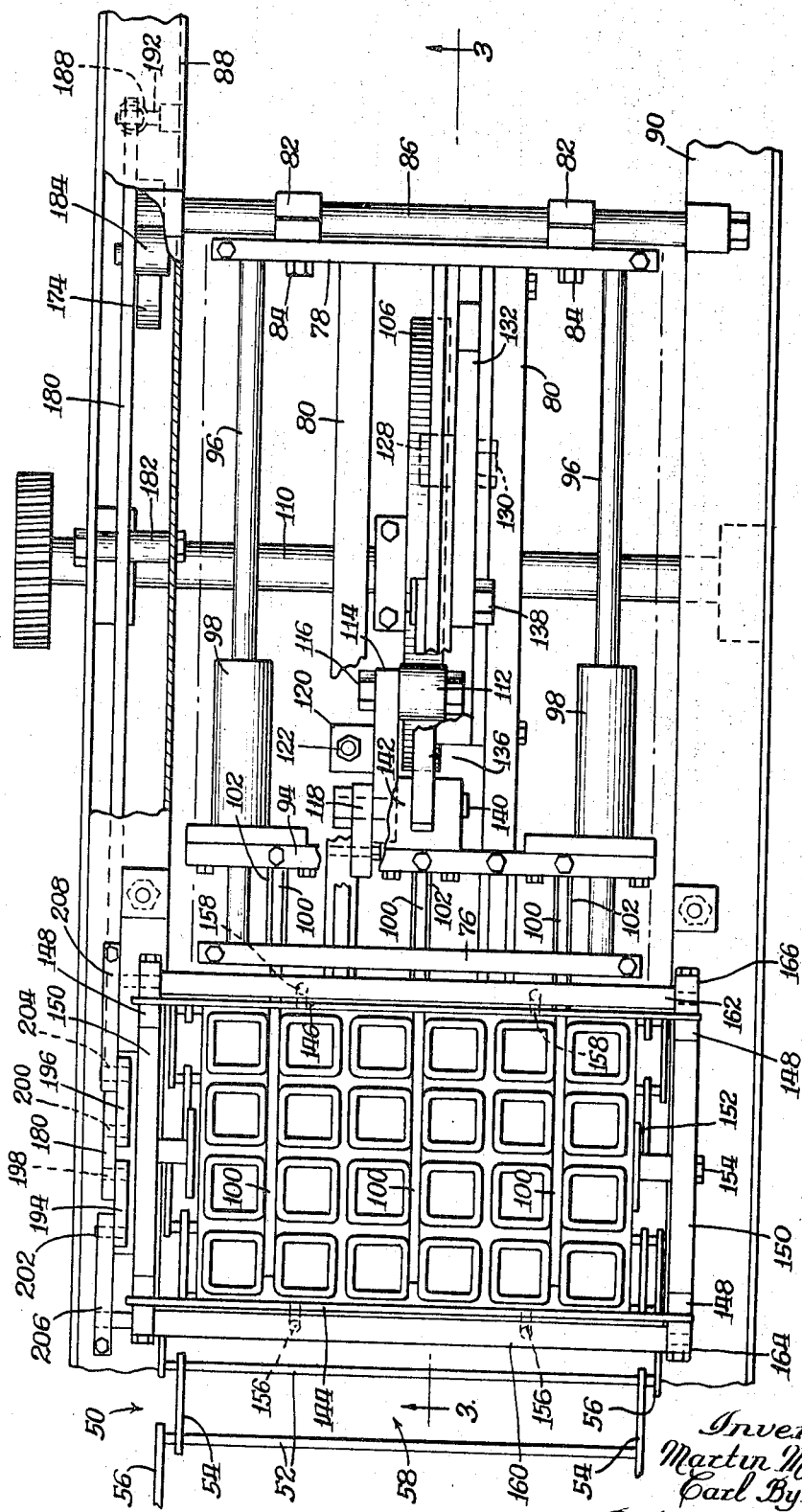

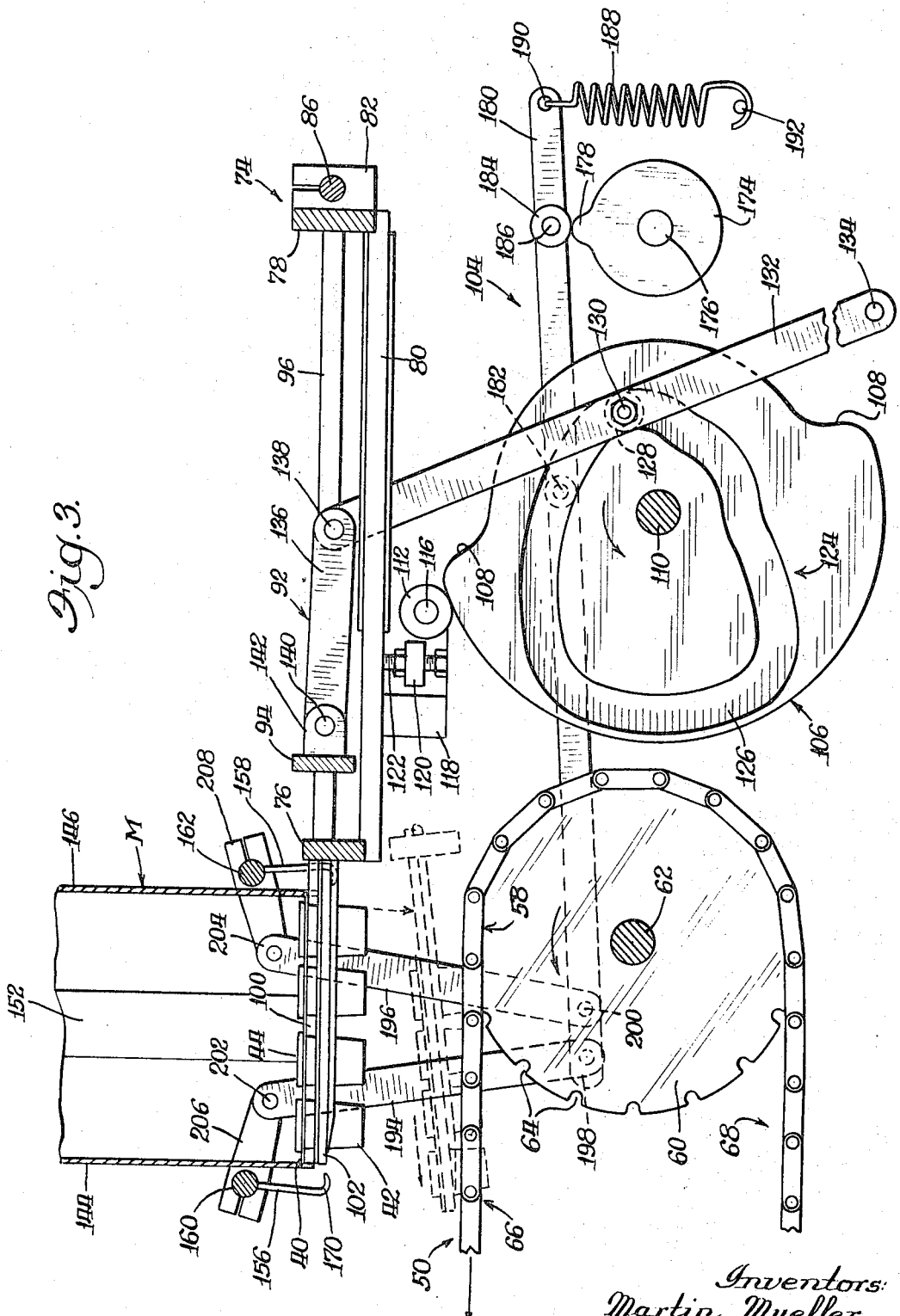

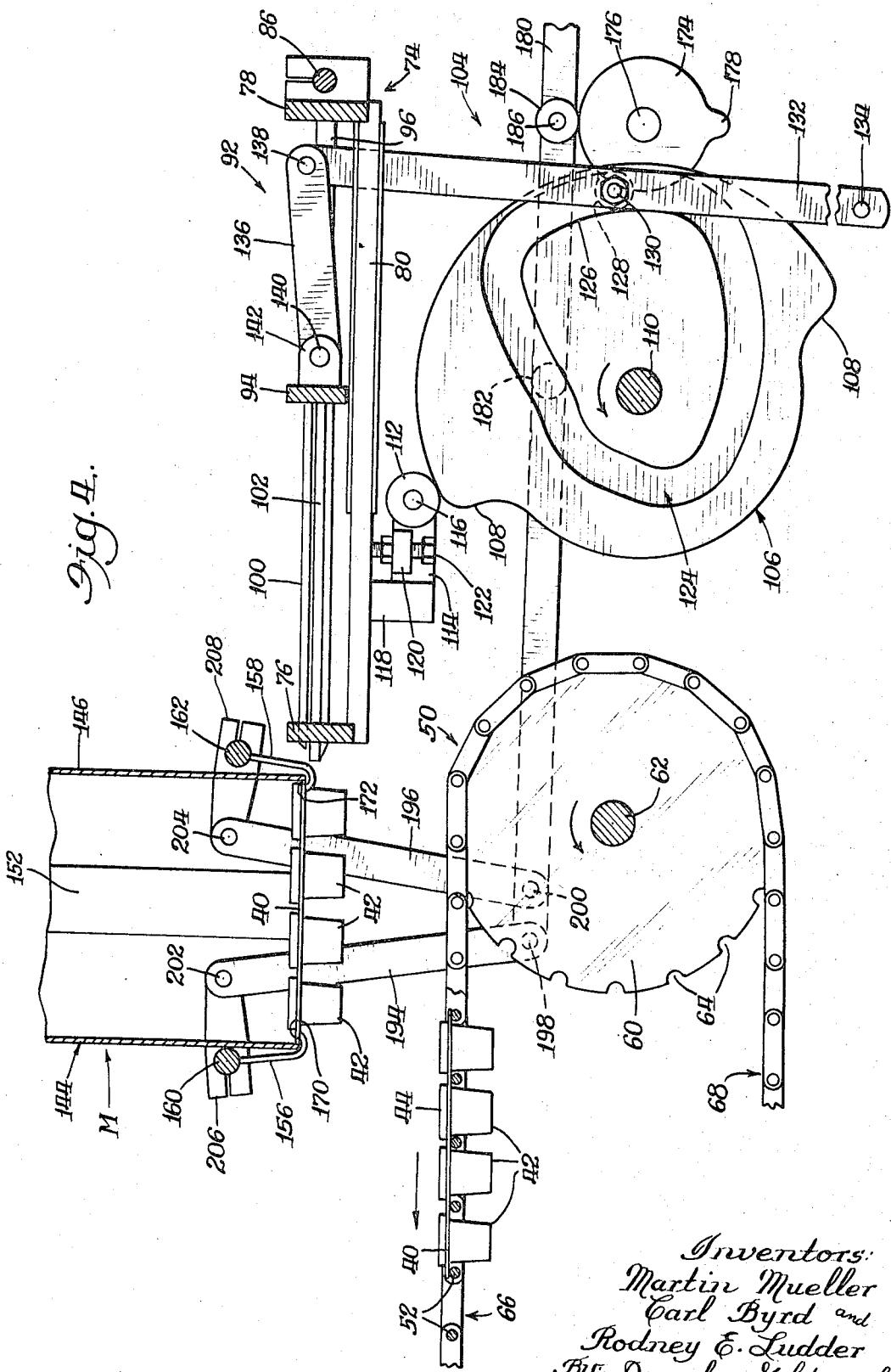

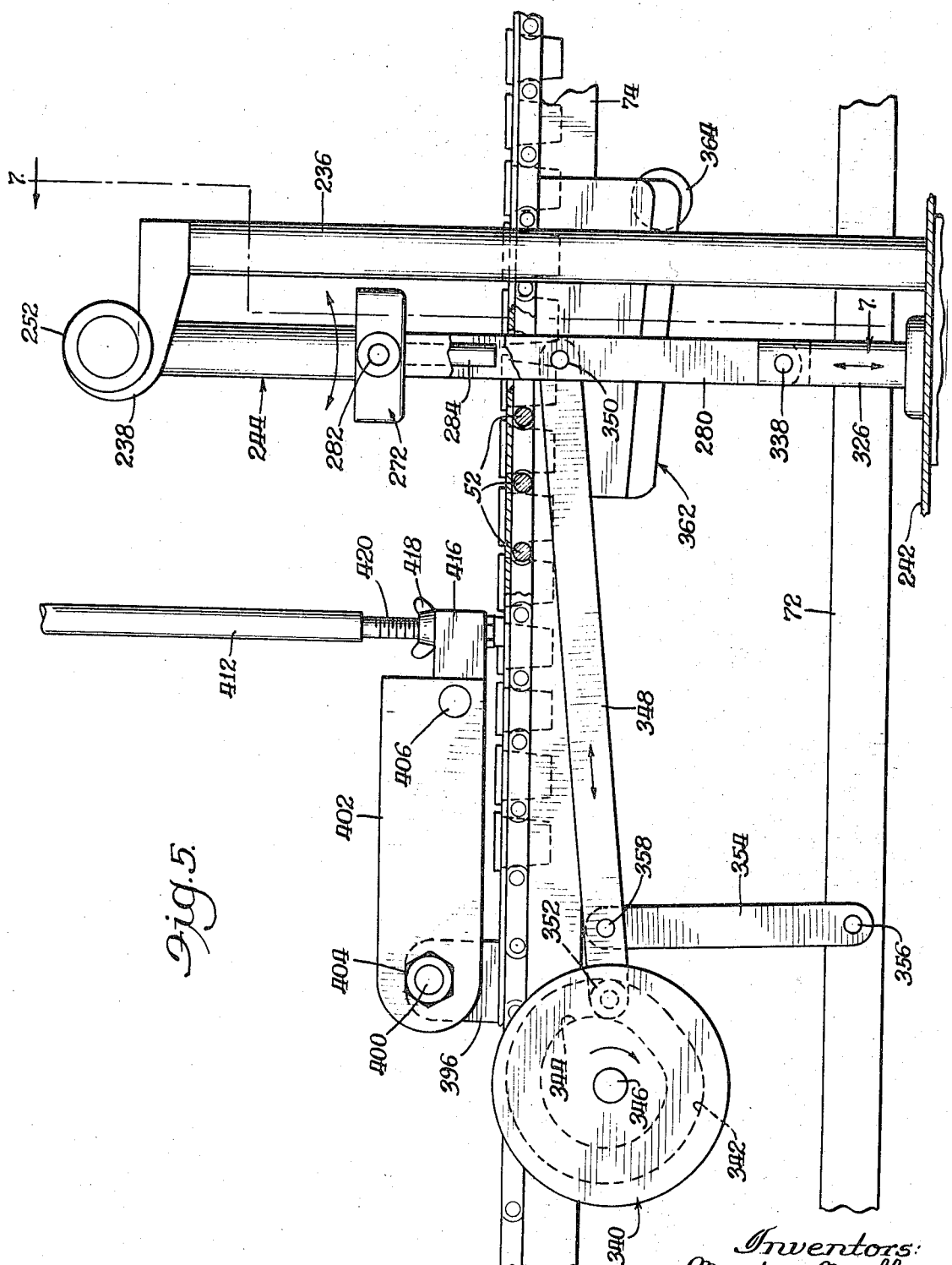

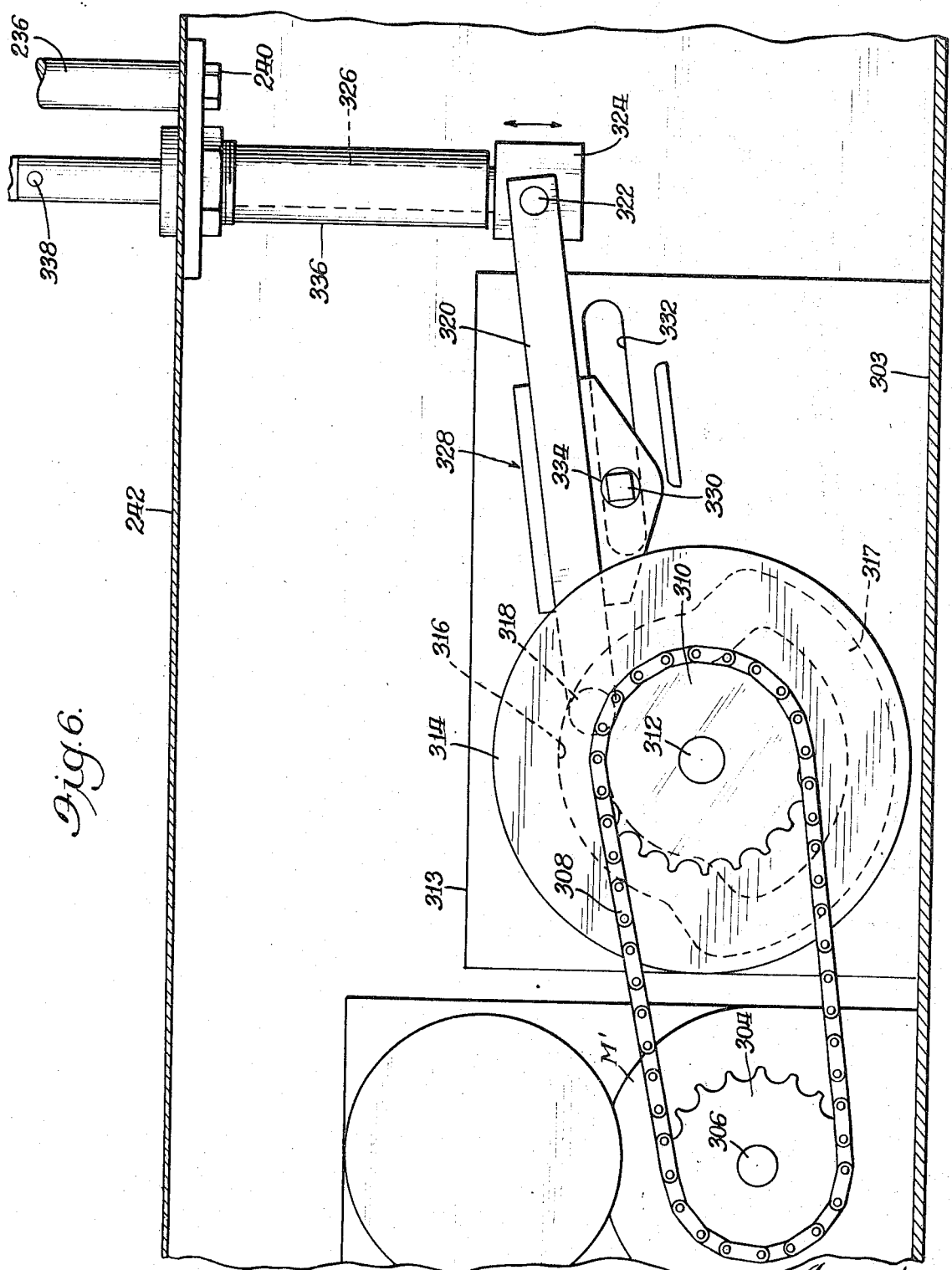

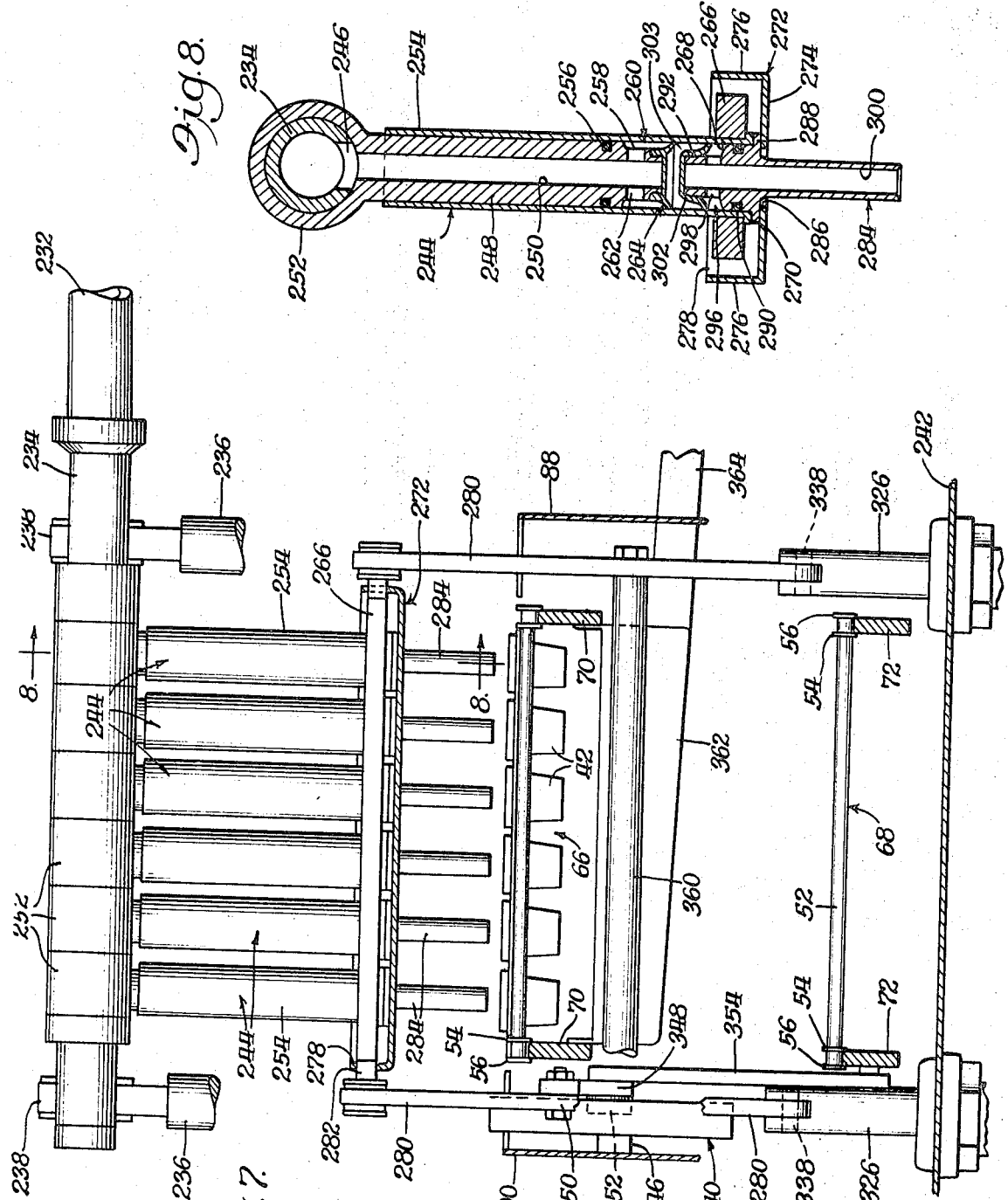

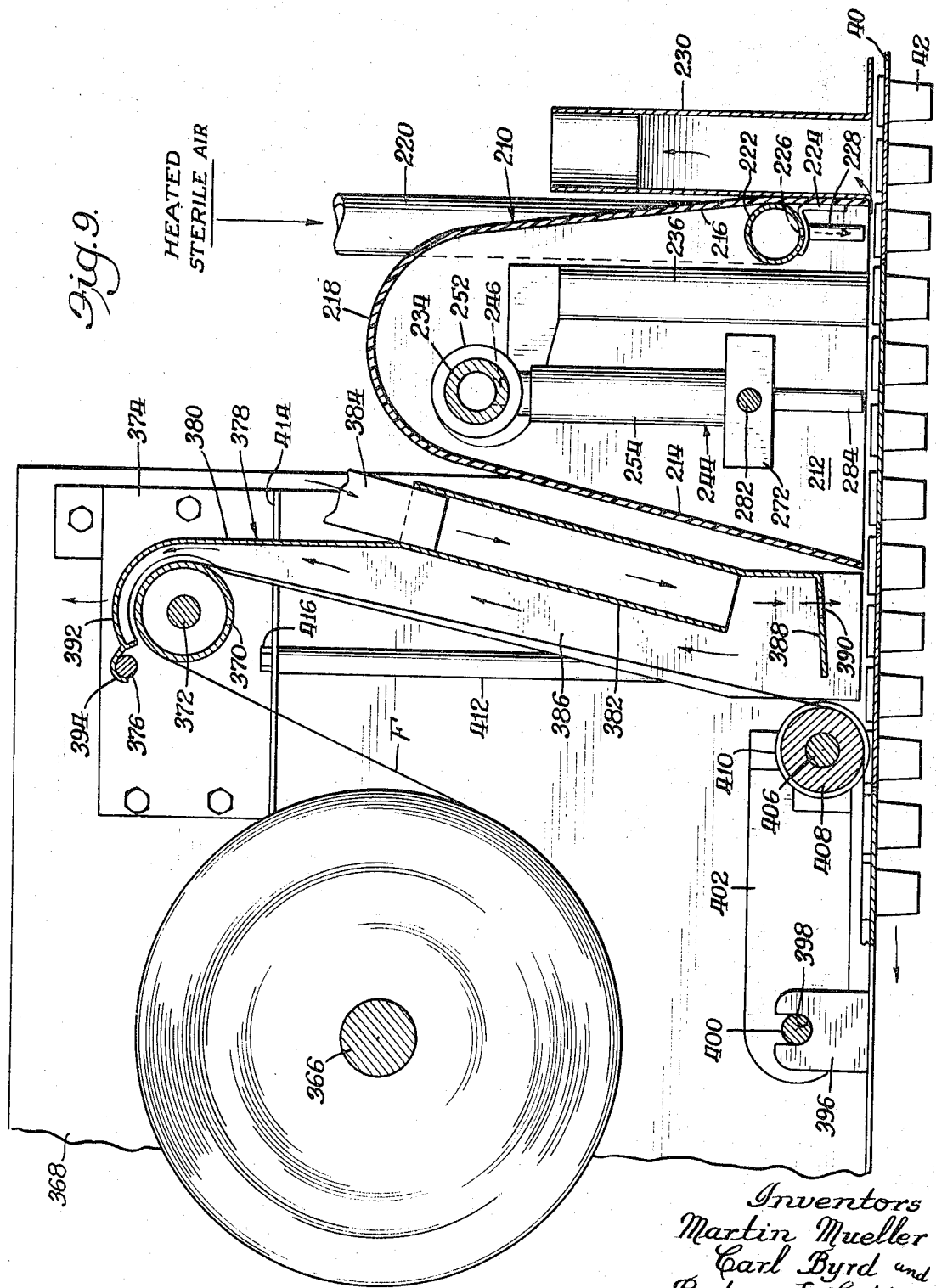

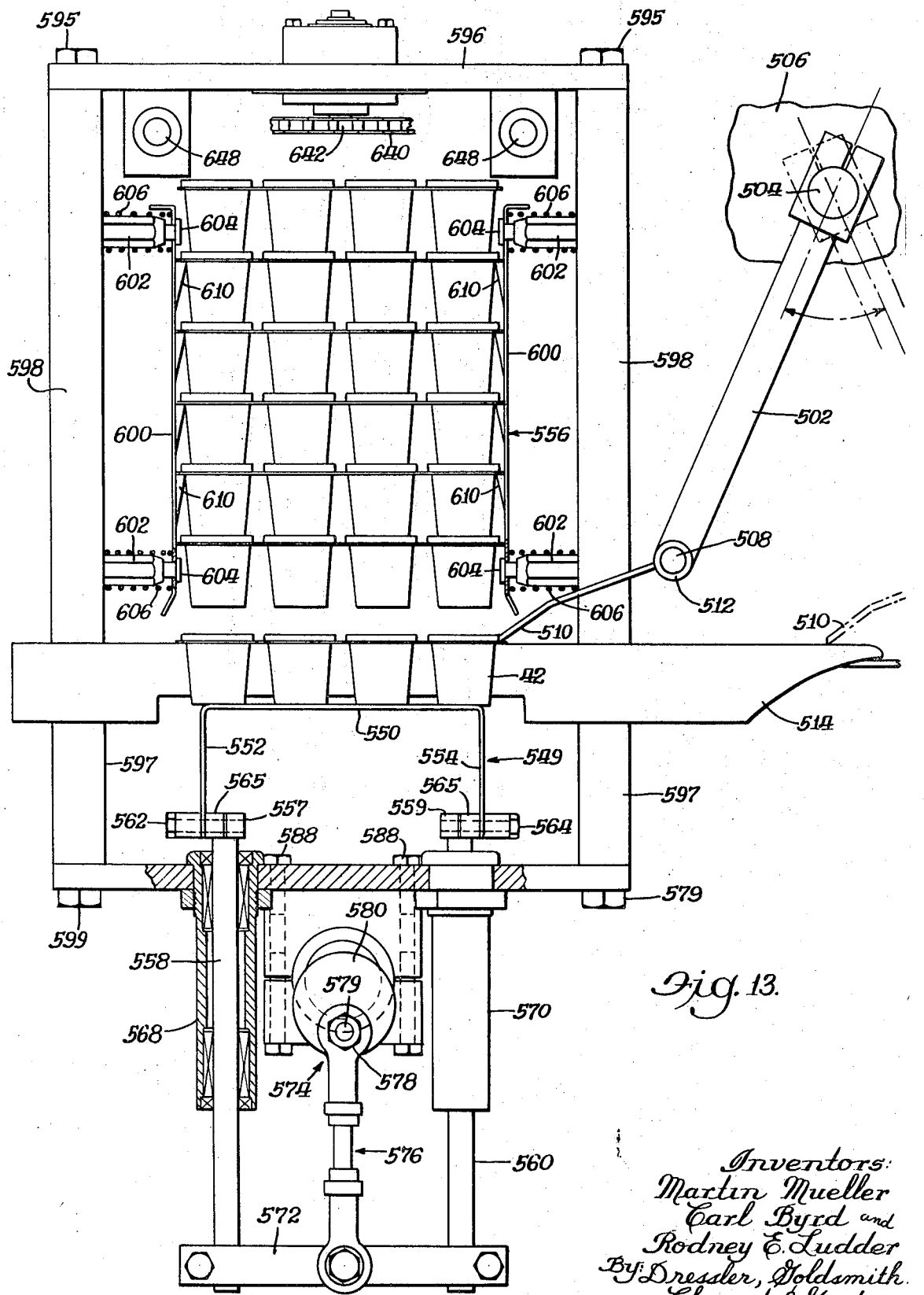

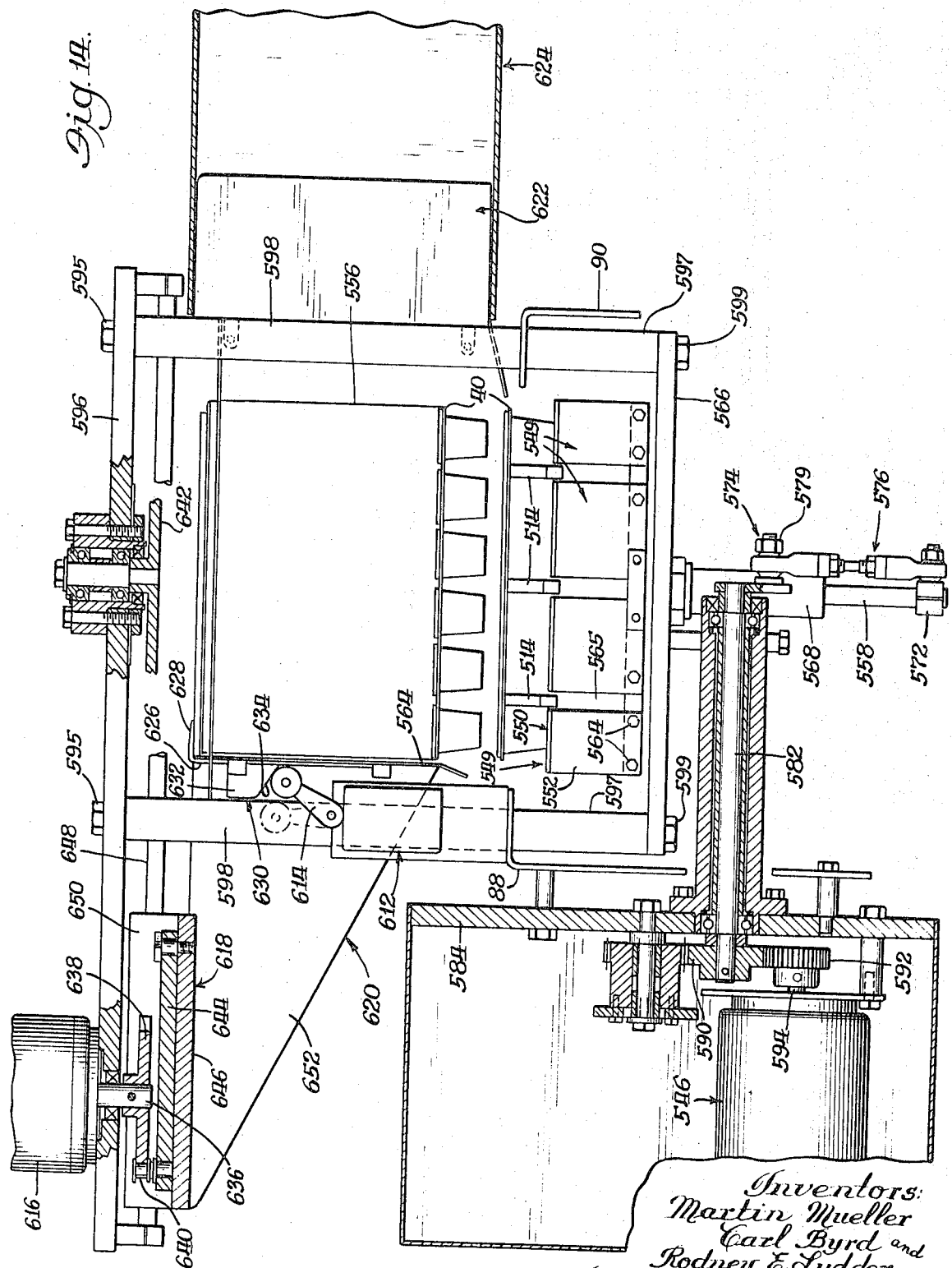

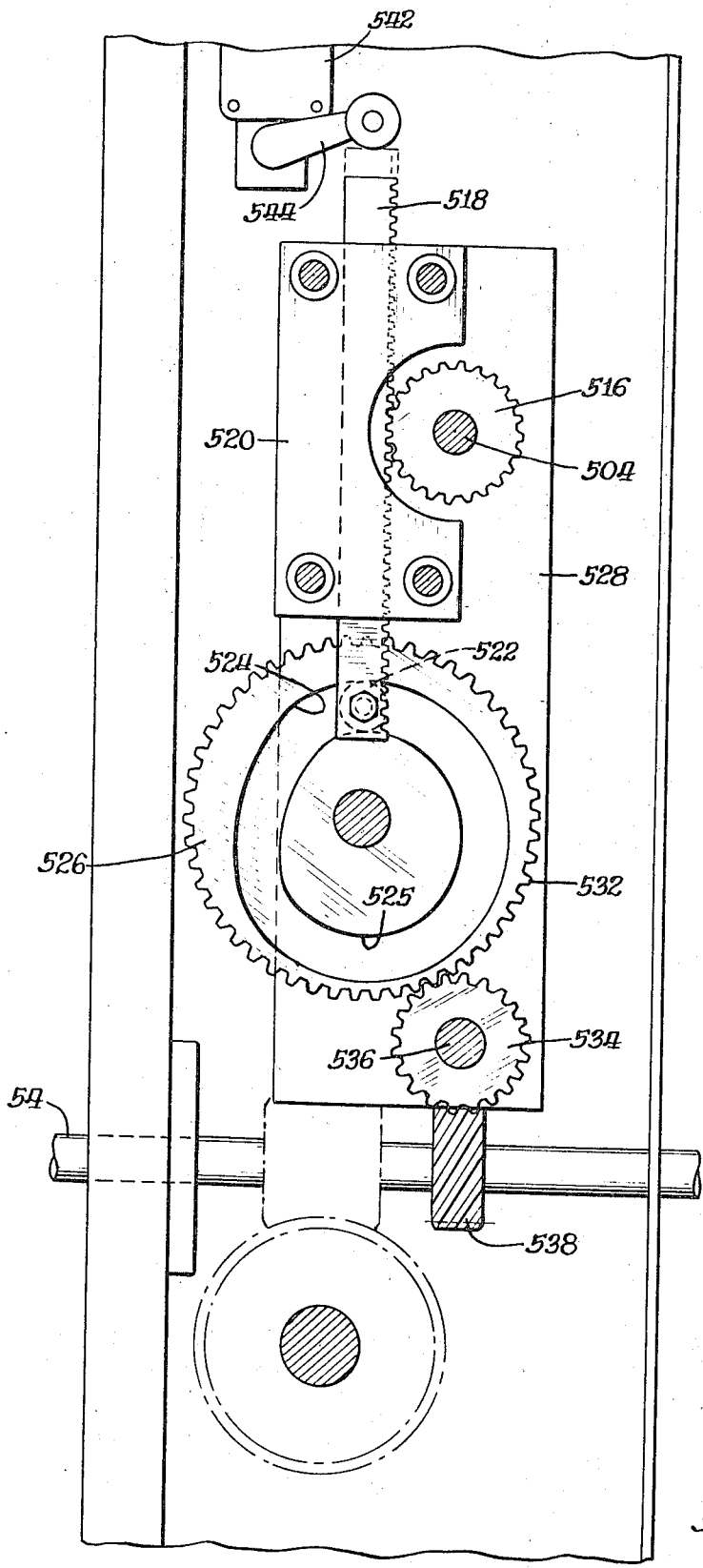

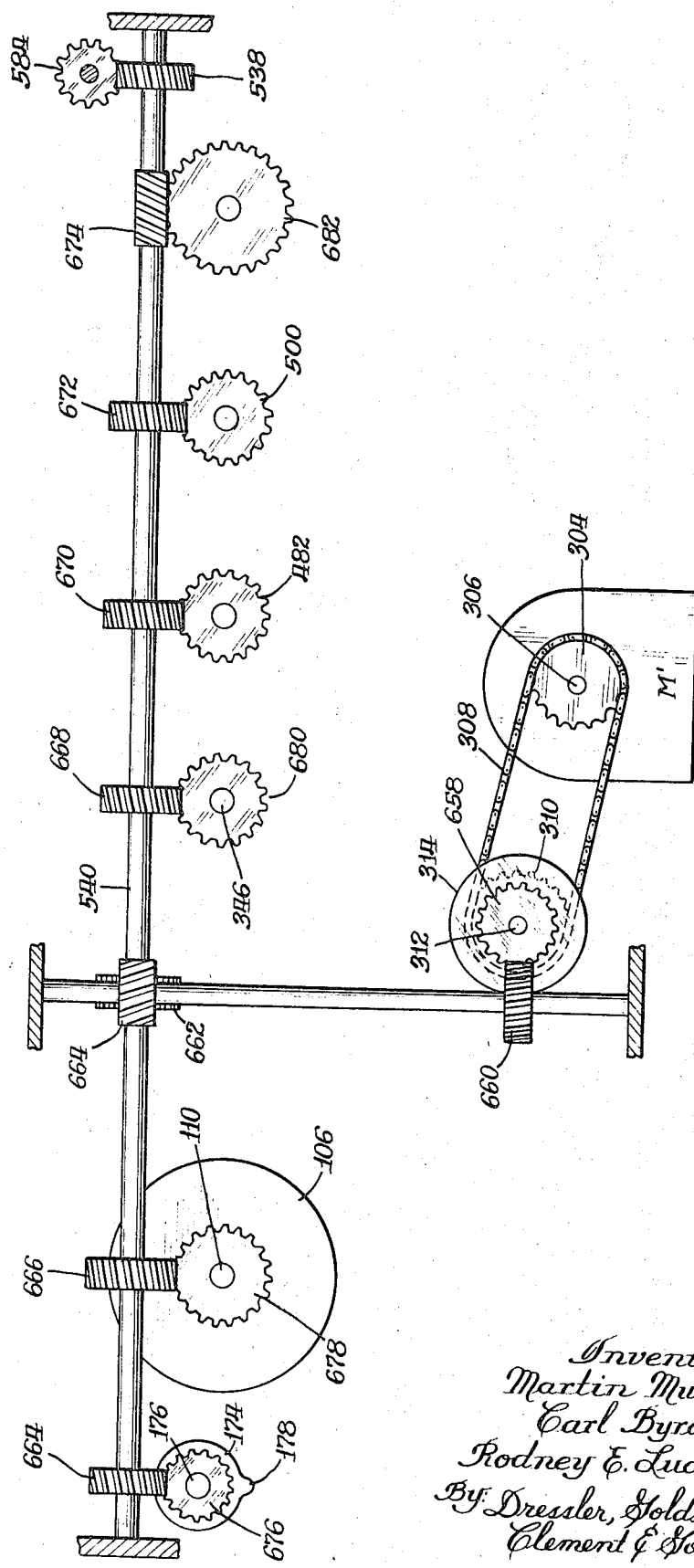

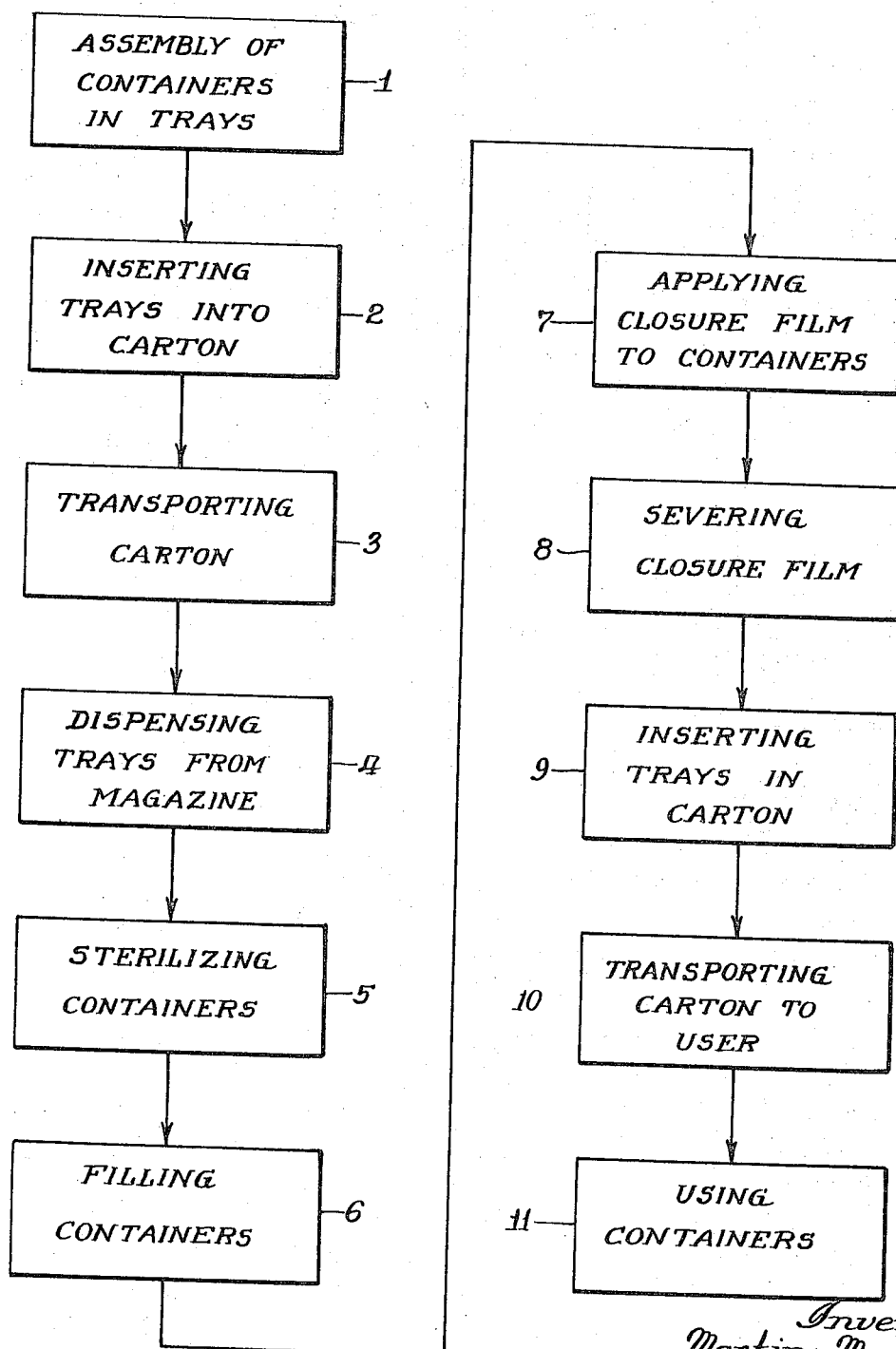

United States Patent Office 3,564,812
Patented Feb. 23, 1971

3,564,812
PACKAGING APPARATUS AND PROCESS
Martin Mueller and Carl Byrd, Chicago, and Rodney E. Ludder, Glen Head, Ill., assignors, by mesne assignments, to Owens-Illinois, Inc., Toledo, Ohio, a corporation of Ohio
Filed Oct. 9, 1968, Ser. No. 766,058
Int. Cl. B65b 1/04, 3/04, 5/00
U.S. Cl. 53—37
21 Claims

ABSTRACT OF THE DISCLOSURE

An apparatus and process for packaging comestibles in containers semi-permanently associated with carrier trays wherein the trays themselves are handled by the apparatus throughout the packaging process, thereby eliminating the need for manually handling individual containers. A stack of trays having internested containers are provided at a dispensing station, and the trays are dispensed one at a time upon a continuously moving conveyor. The conveyor moves the tray to a sterilizing station, where the containers in the tray are sterilized. The sterilized containers are then transported to a filling station, where the comestible to be packaged is placed within the containers. The filled containers then progress to a cover applying station where a cover film is heat sealed to the filled containers. Subsequently, the covered containers move to a cutting station wherein the cover film is both longitudinally and transversely slit to segregate each of the individual containers on its carrier tray. The trays with the filled and sealed containers then pass to a removal station, where the trays are removed and packed for subsequent shipment to an end user.

BACKGROUND OF THE INVENTION

Heretofore, in the art of packaging comestibles in single portion containers, the practice is that the nestable containers are first manufactured, and at the end of the manufacturing process, the containers are placed in a nested stack of containers, which nested stack is either packed individually or in a carton containing a number of the individual stacks. These cartons are then shipped to the actual packaging plant, where the comestible is placed within the container and a closure is placed upon each respective container. Special packaging equipment, well known in the art, is utilized in various plants for dispensing a predetermined quantity of the comestible within the container. In operation, this equipment functions in a manner such that each individual container is denested from the stack of nested containers, as by generally the bottom cup being removed from the nested stack, and the individual container is then progressively moved through the packaging equipment through various stages where it is generally filled and covered.

After the individual container has its closure applied thereto, depending upon its size, it is then often placed or stacked on other like packaged containers until a given number is accumulated. The containers are then placed into a closure or carton, which is then perhaps placed in an outer carton for shipment to the end user.

The difficulty encountered with the present process of packaging is based, in part, on the fact that mechanical equipment, as efficient as it may be, has a tendency to malfunction as the amount of operations in a given period of time is increased. With presently available equipment, it is necessary that each individual container, prior to its beng packaged, be denested and in a sense individually handled and processed throughout the equipment. Accordingly, the equipment becomes complex, and more importantly, the number of times that it must operate to obtain the end result is materially increased.

SUMMARY OF THE INVENTION

To obviate and overcome the difficulties of known practices set forth above, the present invention embodies a new concept of packaging nestable containers such that the individual containers may be positioned and retained in a carrier tray from the source of manufacture of the individual containers, to the shipment of the containers to the packager, and thereafter to the end user. In accordance with the invention, the actual carrier-container assemblies are placed in cartons and shipped to the respective dairies, etc., which fill the individual containers while they remain in the carrier trays, and the carrier trays are then repackaged in cartons or the like for shipment to the end user.

The apparatus of the present invention contains novel means, whereby the trays themselves can be handled, so that the individual handling of cups, per se, and the problems associated therewith of denesting each cup and transporting the same through the equipment is obviated. The present invention includes a novel mechanism for dispensing trays per se upon a continuously moving conveyor, and the present invention also includes novel apparatus for filling the individual containers interlocked with the tray, for heat sealing closure film to the filled containers, for longitudinally and transversely slitting the closure film, and for automatically repackaging the tray in shipping containers.

BRIEF DESCRIPTION OF THE DRAWINGS

FIG. 1 is a perspective view of a preferred embodiment of packaging apparatus formed in accordance with the present invention;

FIG. 2 is an enlarged top plan view of the tray dispensing structure, with certain portions broken away for clarity of illustration;

FIG. 3 is a cross-sectional view, taken generally along line 3—3 of FIG. 2, and illustrating a tray transport assembly in a tray pick-up position in full lines, and illustrating the tray transport assembly in a tray depositing position in broken lines;

FIG. 4 is a cross-sectional view similar to FIG. 3 and illustrating the tray transport assembly in a clearance position;

FIG. 5 is a fragmentary side elevational view of the structure at the dispensing station ,and illustrating in particular the mechanism for synchronizing movement of the comestible dispensing means with the tray transport conveyor;

FIG. 6 is a fragmentary side elevational view of the structure immediately below the structure illustrated in FIG. 5, and illustrating principally the structure for actuating the comestible dispensing means;

FIG. 7 is a cross-sectional view taken generally along line 7—7 of FIG. 5;

FIG. 8 is a cross-sectional view taken generally along line 8—8 of FIG. 7;

FIG. 9 is a central sectional view illustrating principally the structure at the sterilizing, filling, and heat sealing stations;

FIG. 13 is a fragmentary front elevational view of the structure at the tray removal station;

FIG. 14 is a side elevational view of the structure illustrated in FIG. 13;

FIG. 15 is a rear elevational view of the drive structure for actuating the tray removal means;

FIG. 16 is a schematic representation of the drive to the various structures of the apparatus of the present invention; and FIG. 17 is a flow diagram illustrating the process of the present invention.

DESCRIPTION OF THE PREFERRED EMBODIMENT

GENERAL ORGANIZATION

Figure 10:
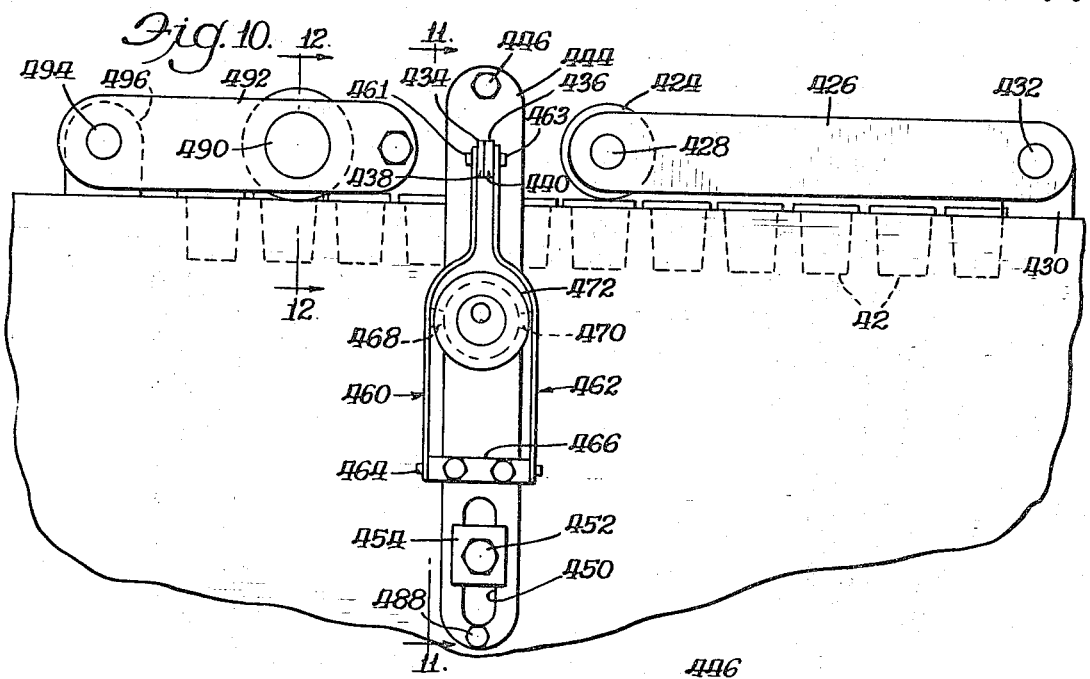
FIG. 10 is a fragmentary side elevational view illustrating the cover film severing structure.

The packaging apparatus for the present invention is illustrated at 20 in FIG. 1, and includes a drive mechanism to be hereafter described within a housing 22 for moving a conveyor, also to be hereafter described, past a tray dispensing station 24, a sterilizing station 26, a filling station 28, a sealing station 30, a transverse slitting station 32, a longitudinal slitting station 34, and to a tray removal and packaging station 36. The packaging apparatus 20 is adapted to function upon a tray-like carrier means having a plurality of containers releasably interlocked therewith, and the tray and container structure that is usable in conjunction with the process and apparatus of the present invention is disclosed and claimed in the commonly assigned, concurrently filed application Ser. No. 766,087 of Rodney E. Ludder, entitled "Packaging Structure."

As is described in detail in the above-mentioned Ludder application, the carrier means is in the form of a semirigid tray 40 (FIGS. 2–4) having a plurality of transversely and horizontally aligned rows of openings for holding containers 42 therein. The containers 42 include an enlarged rim 44 which seats upon the upper surface of the tray 40 around the opening therein, and projections (not shown) extend outwardly from the sidewalls of the container below the lower end of rim 44, so as to be disposed beneath the lower surface of the tray 40 to releasably interlock the containers with the trays. The sidewalls of the containers 42 diverge slightly, so that when a stack of trays is placed in a magazine, such as that illustrated at M in FIGS. 1–4, the containers 42 will internest with one another to position the trays 40 in spaced parallel relationship with respect to one another.

Conveyor means 50 is provided for transporting the trays 40 past the operating stations 24, 26, 28, 30, 32, 34 and 36, and conveyor 50 is defined by a plurality of spaced, parallel rods 52 (FIGS. 2–4) having their outer ends journaled in inner links 54 and outer links 56. As is evident from FIG. 2, the spaced rods 52 define an elongate, rectangular opening 58 therebetween, and the openings 58 are adapted to receive therewithin the containers 42 when the tray 40 is dispensed onto the conveyor, as will hereinafter be described. Conveyor 50 is trained over sprockets 60 at both sides of opposite ends of the packaging apparatus, and as can be best seen in FIGS. 3 and 4, sprockets 60 are mounted for rotation with shafts 62, and include a plurality of notches 64 in the outer periphery thereof for engagement with rods 52. The sprockets 60 adjacent the left hand end of the packaging apparatus are preferably driven by structure to be hereafter described, and the sprockets 60 adjacent the right hand end of the apparatus are preferably idler sprockets. Conveyor 50 is defined by an upper reach 66 between the upper ends of the sprockets 60 and a lower reach 68 between the lower ends of the sprockets 60. As can be best seen in FIG. 7, the outward ends of rods 52 of the upper reach 66 ride upon spaced parallel upper guide rails 70, while the outer ends of the rods 52 of the lower reach 68 ride upon spaced parallel lower guide rails 72.

Tray feeding mechanism

The tray feeding mechanism will be best understood from FIGS. 2–4, and as illustrated therein, the tray feeding mechanism includes a pivotally mounted tray transport assembly 74 defined in part by a transverse rail 76 adjacent magazine M and a transverse rail 78 spaced to the right thereof, with longitudinally extending stabilizing arms 80 connecting rails 76 and 78. Bearing members 82 are secured at spaced positions to rail 78 by bolts 84, and bearing members 82 are journaled upon a transversely extending rod 86, the outer ends of which are secured to laterally spaced longitudinally extending frame members 88 and 90.

The tray transport assembly 74 further includes a tray carrier mechanism 92 that is mounted for movement longitudinally with respect to the packaging apparatus. The tray carrier mechanism 92 includes a crosshead in the form of a transversely extending rail 94 that is mounted for longitudinal movement relative to the transport assembly 74 upon a pair of spaced parallel guide rods 96 thta are connected at opposite ends to rails 76 and 78. A pair of cylindrically shaped follower sleeves 98 are fixed to crosshead 94 and are slidably mounted upon guide rods 96.

A plurality of tray supporting and guiding fingers extend outwardly from crosshead 94 and said fingers include a plurality of laterally spaced, parallel upper fingers 100, and a plurality of laterally spaced, parallel lower fingers 102. Fingers 100 are spaced from fingers 102 by a distance slightly in excess of the thickness of the tray 40, so that when the fingers move from the clearance position of FIG. 4 to the pick-up position of FIG. 3, the fingers will easily clear the lowermost tray 40 in the stack of trays within the magazine M. As can be seen in FIG. 2, three upper fingers 100 and three lower fingers 102 are provided, with the fingers having a width to fit between the transverse rows of containers 42 on tray 40. It will be readily appreciated that any number of supporting and guiding fingers may be used.

Drive means 104 (FIGS. 3 and 4) is provided for moving the tray transport assembly 74 from the clearance position of FIG. 4 to the tray pick-up position illustrated in full lines in FIG. 3, and thence to the tray dispensing position illustrated in broken lines in FIG. 3. The drive means 104 is synchronized with the drive to the conveyor 50 through the power train illustrated in FIG. 16, so that the trays will be properly timed in a manner such that the leading longitudinal row of containers 42 will be aligned with a rectangular area 58 between bars 52 when the tray carrier assembly 74 is in the broken line dispensing position of FIG. 3, whereby the conveyor 50 will automatically pick up and transport the tray.

Drive means 104 includes a cam 106 mounted for rotation with a transverse shaft 110, and cam 106 includes an external cam profile including generally diametrically opposed rise portions 108. A cam follower roller 112 rides upon the external profile of cam 106, and cam follower roller 112 is rotatably mounted upon a pin 116 that extends transversely relative to a longitudinally disposed carrier link 114. Carrier link 114 is secured to a vertically disposed mounting link 118 that is secured to one of the stabilizing arms 80, and the position of the tray transport mechanism 74 relative to the cam 106 is controlled by means of a bolt 122 that is threaded through a laterally disposed plate 120 fixed to link 114, with the upper end of bolt 122 bearing against stabilizing arm 80.

Referring specifically to FIG. 3, it will be appreciated that with the cam 106 rotating in a counterclockwise direction, when the follower 112 moves down the rise portion 108, the tray transport mechanism 74 will pivot in a counter-clockwise direction about rod 86 from the full line tray pick-up position to the broken line position for depositing the lowermost tray upon conveyor 50. As the cam 106 continues to rotate to bring the diametrically opposed rise portion 108 into engagement with follower 112, the tray transport mechanism 74 is pivoted in a clockwise direction about rod 86.

Cam 106 includes an internal cam profile 124 including an eccentric, offset portion 126 for moving the tray transport mechanism 74 between the clearance position of FIG. 4, and the full line tray pick-up position of FIG. 3. A cam follower 128 rides in the internal cam slot 124, and follower roller 128 is carried upon a pivot bolt 130 that is secured to the midportion of an elongate carrier link 132. Link 132 is pivotally mounted adjacent its lower end 134 to suitable frame structure (not shown) and the upper end of link 132 is pivotally connected at 138 to the right hand end of a generally fore and aft link 136. The opposite end of link 136 is pivotally connected at 140 between the spaced parallel ears of a clevis member 142 that is secured to crosshead rail 94.

Thus, as cam 106 rotates in a counterclockwise direction from the position of FIG. 4 toward the position of FIG. 3, link 132 pivots in a counterclockwise direction about pivot 134 as cam follower roller 128 moves off of the enlarged track portion 126. As link 132 pivots in a counterclockwise direction, the tray carrier assembly 92 moves from the clearance position of FIG. 4 into the tray pick-up position of FIG. 3. After the tray carrier assembly 92 has been moved to the broken line tray dispensing position of FIG. 3 by the external cam profile on cam 106, the enlarged internal cam portion 126 again moves into engagement with cam follower roller 128 to pivot the link 132 in a clockwise direction to return the tray transport mechanism 74 to the clearance position of FIG. 4.

The tray dispensing magazine M is defined by a pair of vertically disposed, longitudinally spaced plates 144 and 146, the opposite ends of which are supported by upright frame members 148 (FIG. 2). Horizontally disposed frame members 150 are secured between upright frame members 148, and upright guide members 152 are secured to frame members 150 by bolts 154, with guide members 152 being spaced from one another by a distance slightly larger than the length of the trays 40 to positively confine the trays between the plates 144 and 146. An open rectangular boot 151 is secured to the lower end of the magazine M, for guiding and supporting a tray holding carton C within the magazine. It will be appreciated that by placing the tray shipping carton C in the magazine M, manual handling of the tray is entirely eliminated. A supporting plate 153 may be slidably inserted beneath the carton C to support the stack of trays prior to actuation of the machine.

The present invention includes means for supporting all of the trays in the stack of trays within magazine M, and for releasing the lowermost tray in the stack of trays when the tray transport mechanism 74 is in the tray pick-up position illustrated in FIG. 3. The stack holding means includes a stack holding finger 156 adjacent magazine wall 144, and a stack holding finger 158 adjacent magazine wall 146, with finger 156 being carried upon a rock shaft 160, and with finger 158 being carried upon rock shaft 162. Rock shafts 160 and 162 are supported in bearing blocks 164 and 166 (FIG. 2), respectively, that are secured to frame members 148. Stack supporting fingers 156 and 158 include respective hook-like lower ends 170 and 172 that are movable between a stack holding position projecting beneath the open bottom of the magazine M (FIG. 4) and a tray release position spaced outwardly of the magazine M (FIG. 3).

The means for moving the fingers 156 and 158 between the stack supporting and tray releasing positions includes a cam 174 rotatably mounted upon a shaft 176, with cam 174 including an offset lobe portion 178. Cam 174 is synchronized with cam 106 and conveyor 50 by the drive structure illustrated in FIG. 16 to be hereafter described, so that the lowermost tray in the stack of trays will be released when the tray carrier assembly 92 is in the tray pick-up position of FIG. 3. The finger actuating means further includes an elongate link 180 having its intermediate portion pivotally mounted to frame member 88 at 182, with link 180 having a cam follower roller 184 mounted adjacent the right hand end thereof by pivot pin 186. Link 180 is biased in a clockwise direction by a spring 188 that is connected at 190 to the right hand end of the link 180 and at 192 to frame member 88.

A pair of generally upright actuating links 194 and 196 are pivotally connected at their lower ends at 198 and 200, respectively, to the left hand end of link 180, and the upper ends of links 194 and 196 are pivotally connected at 202 and 204, respectively, to rock shaft actuating arms 206 and 208 that embrace rock shafts 160 and 162, respectively. Thus, when the lobe portion 178 of cam 174 moves into engagement with cam follower roller 182, link 180 is pivoted in a counterclockwise direction about pivot 182 against the bias of spring 188 which moves links 194 and 196 downwardly to pivot rock shafts 160 and 162 and move the fingers 156 and 158 to the tray release position (FIG. 3). After the lowermost tray in the stack of trays begins its movement from the full line pick-up position of FIG. 3 toward the broken line dispensing position, cam follower roller 184 moves off lobe portion 178, so that the fingers 156 and 158 are returned to the stack supporting position of FIG. 4 to support the remaining trays in magazine M.

Container sterilizing and filling means

As the trays 40 are dispensed one at a time upon the conveyor 50, the conveyor transports them to the sterilizing station 26 and the filling station 28, the structure of which will be best understood from FIGS. 5–9. The sterilizing and filling mechanisms are disposed within a hood 210 (FIG. 9) and hood 210 is defined by spaced parallel end walls 212, and upwardly converging side walls 214 and 216 that join one another at a rounded merger 218. The hood 210 is supported upon the frame of the packaging apparatus by suitable support structure, not shown, and the lower ends of hood walls 212, 214 and 216 are positioned in close proximity to the upper ends of the containers 42, so as to be disposed in semi-sealed relationship with respect thereto.

Heated air for sterilizing the containers 42 is provided by a suitable heating mechanism and pumping means, not shown, and the heated air passes into hood 210 through a pipe 220 that communicates with a horizontally disposed dispensing manifold 222. Manifold 222 is supported upon a bracket 224 that is fixed to the inner surface of hood side wall 216, and manifold 222 includes a plurality of laterally spaced openings 226, each of which communicates with a nozzle 228. The nozzles 228 are each positioned in alignment with one of the containers 42 in the transverse row of containers in trays 40, so that as the containers 42 pass beneath the nozzles 228, hot air is blown into the interior of the container to sterilize the same. The heated air passes outwardly of hood 210 beneath wall 216 to an escape chimney 230.

While the packaging apparatus of the present invention has utility in packaging many different types of comestibles and like products, the apparatus has specific utility in packaging individual portions of cream, so that the container filling apparatus hereafter described is in the form of a pumping means for providing a predetermined quantity of cream within the containers 42. The cream is stored in a suitable reservoir and is pumped to the container filling means by pumping means (not shown) that communicate with hose 232 (FIG. 7). Hose 232 communicates with a transversely disposed manifold 234 that is spaced above conveyor 50, and which is supported by upright posts 236 having hook-like manifold supports 238 (FIG. 5) at the upper end thereof. The lower ends of posts 236 are secured to a horizontally disposed frame member 242 by bolts 240 (FIG. 6). A plurality of identical filling heads 244 communicate with manifold 234, and the structure of the filling heads 244 will be best understood from FIG. 8.

Manifold 234 includes a plurality of transversely spaced, downwardly facing openings 246, one opening being provided for each filling head 244. Each filling head 244 includes an elongate stem 248 having a central passage 250 therein, with each passage 250 being positioned in communication with an opening 246, as will hereinafter appear. The upper end of each stem 248 is in the form of a generally cylindrical sleeve 252 that is pivotally mounted upon manifold 234. An outer sleeve 254 is slidably mounted upon each stem 248, and a seal 256 is positioned in a recessed portion of the stem 248 adjacent the lower end thereof to prevent fluid from passing upwardly between stem 248 and sleeve 254. Stem 248 has a portion 258 of reduced diameter at the lower end thereof to define an annular chamber 260 between the stem portion 258 and the sleeve 254. A plurality of passages 262 extend through stem portion 258 to establish communication between central passage 250 and chamber 260. A flexible valve element 264 is secured to the lower end of stem 248, and is positioned in sealing engagement with the inner surface of sleeve 254.

Fluid is pumped from the filling heads 244 in response to vertical movement of the sleeves 254, and the sleeves 254 are connected to a common actuating member in the form of a horizontally disposed, transversely extending plate 266. Plate 266 includes a plurality of laterally spaced openings 268, one for each sleeve 254, and sleeves 254 have an outwardly extending flange 270 at the lower end thereof that embraces the lower surface of plate 266 around the opening 268. The outer ends of plate 266 are mounted in a carrier member 272 that is generally cup-shaped in cross section, and which is defined by a bottom wall 274, upright sidewalls 276, and upright end walls 278. Plate member 266 terminates in stub shaft portions 282 that extend through openings in the end walls 278 of carrier member 272, where they are pivotally connected to the upper ends of travel arms 280 for synchronizing movement of the filling head 244 with the movement of the conveyor 50, as will hereinafter appear.

Each filling head 244 includes a nozzle 284 that is movable up and down with its respective sleeve 254. Nozzles 284 extend downwardly through openings 286 in the bottom wall 274 of member 272, and the nozzles include an enlarged flange 288 seated upon the upper surface of bottom wall 274 around openings 286, with the nozzle flanges 288 being positioned below the outwardly extending flanges 270 on the sleeves 254. A seal 290 is provided in an annular groove in each nozzle 284 to prevent fluid from escaping between the lower end of sleeve 254 and the nozzle. The upper end 292 of each nozzle 284 is of reduced diameter to define an annular chamber 296 between the upper end of the nozzle and the lower end of sleeve 254. A plurality of openings 298 extend outwardly of the upper end of nozzles 284 to establish communication between chamber 296 and a central passage 300 in the nozzle. A flexible valve element 302 is fixed to the upper end of nozzle 284, and is positioned in sealing engagement with the inner surface of sleeve 254 to control the flow of fluid through the nozzle. Valve elements 264 and 302 cooperate to define a chamber 301 therebetween.

The means for moving the sleeves 254 of the filling heads 244 up and down through a pumping stroke will be best understood from FIG. 6. A motor M is supported upon a horizontally disposed frame member 303, and a sprocket 304 is connected to the output shaft 306 of the motor M', with an endless chain 308 being trained over sprocket 304 and over a further sprocket 310 carried by a shaft 312 that is journaled in an upright support plate 313 fixed to frame member 303. A cam 314 is fixed to shaft 312 for rotation therewith, and cam 314 includes an inner cam track 316 having an offset actuating portion 317. A cam follower roller 318 is provided at one end of a link 320, and rides in cam track 316, with the opposite end of link 320 being pivotally connected at 322 to a mounting block 324 connected between the lower ends of a pair of laterally spaced, vertically movable lift rods 326. Link 320 is slidably mounted within a guide block 328 that is pivotally mounted on upright plate 313 by a pivot bolt 330. Guide plate 313 includes a slightly upwardly inclined slot 332, and a clamping member 334 bears against an opposite side of plate 313 from the head of bolt 330, so that the position of guide member 328 can be adjusted relative to the plate 313. It will be appreciated that by varying the position of guide block 328, the fulcrum for lever 320 can be adjusted to vary the amount of vertical movement of lift rods 326.

Guide sleeves 336 (FIG. 6) are secured to the lower portion of frame members 242, and guide the lifting rods 326 in their up and down pump actuating movement. Lift rods 326 extend upwardly through frame member 242 and the upper end of lift rods 326 are connected to the lower end of travel arms 280 by pivot pins 338. The mechanism for swinging the filling heads 244 to synchronize the movement of the nozzles 284 relative to the conveyor 50 will be best understood from FIG. 5. The nozzle synchronizing means includes a steering cam 340 mounted for rotation on frame member 90 by a shaft 346, with cam 340 including a cam track 342 having an offset portion 344. A generally longitudinally extending actuating link 348 is pivotally connected to the midportion of a travel link 280 at 350, with the opposite end of link 348 having a follower roller 352 received in cam track 342. A guide link 354 is pivotally connected at 356 at one end to rail 72 and at the other end at 358 to link 348 adjacent follower 352. Rail 72, and links 354, 348 and 280 cooperate to define a four bar linkage means, with the length of the side defined by link 280 changing in length due to the lifting action of rods 326. A connecting link 360 is secured between travel arms 280 to connect them for simultaneous movement.

As is set forth above, the fluid to be pumped, such as cream, flows from manifold 234 into chambers 260 through passages 246, 250 and 262. When the lift rods 326 are moved downwardly by cam 314 and link 320, the sleeves 254 of the filling heads 244 are moved downwardly, while valve element 302 draws a suction within chamber 260 to compress the valve element 264 inwardly allowing fluid to flow into chamber 303. The downward stroke of lift rods 325 is timed to take place during counterclockwise pivotal movement of the filling heads 244 by the steering cam 340 and four bar linkage means. When the lift rods 325 begin clockwise pivotal movement, the sleeves 254 are moved upwardly by the cam 314 and link 320, and the back pressure within the chambers 303 between the valve elements 264 and 302 causes the valve elements 302 to flex inwardly, allowing the fluid to pass into chambers 296, through openings 298, and outwardly of nozzles 284 through passages 300.

An upwardly opening spillage tray 362 is secured between rail members 70 beneath nozzles 284 at the filling station 28 to receive any spillage from the nozzles 284. A conduit 364 communicates with the spillage tray 362 and with a storage reservoir.

Film applying and severing structure

After the containers have been sterilized and filled, conveyor 50 transports the containers to the closure applying station 30. With reference to FIG. 9, it will be noted that a roll of film F is mounted upon a shaft 366 that is rotatably carried by frame member 368. The film F is trained upwardly over a transversely extending, horizontally disposed roll 370, the ends of which terminate in stub shaft portion 372 that are rotatably received in spaced mounting plates 374. The film F passes downwardly and slightly forwardly from roll 370, where the film is heated.

A transverse mounting rod 376 is secured between plates 374, and a hot air deflecting shield 378 is secured to rod 376 and to frame members 88 and 90 adjacent the downwardly extending run of film F. Shield 378 includes a generally upright rear wall 380 having a tubular air supply conduit 382 formed integrally therewith. Conduit 382 is connected by a hose 384 to a means for providing air at an elevated temperature, such as the heating element and pump for providing the sterilizing air in tube 220. Shield 378 further includes a pair of spaced, generally triangularly shaped side plates 386 that extend perpendicularly with respect to wall 380 at the ends thereof, and a baffle 388 is provided at the lower end of wall 380 at generally right angles with respect to wall 380 and sidewalls 386. Baffle 380 preferably includes a plurality of laterally spaced openings 390 for allowing the hot air emerging from conduit 382 to impinge upon the containers 42 to preheat the rims 44 thereof. The remaining air is directed upwardly by baffle 388, as shown by the arrows in FIG. 9, and passes between walls 380 and 386 to heat the film F. While the film F is relatively uniformly heated, it will be appreciated that the side of the film facing the air stream, which is the side of the film to be sealed to the containers 42, is raised to a temperature that is above the temperature of the opposite side of the film. The upper end of walls 380 and 386 are curved about roll 370, and openings 392 are provided in the upper end of wall 380 to allow the hot air to escape to atmosphere. Wall 380 includes a curved upper end 394 that seats upon the transverse rod 376 to positively retain the shield 378 relative to the frame members 374. In the present invention, the film F preferably includes a waxlike adhesive on at least the lower side thereof, and the film heating air is raised to a temperature that is sufficient to render the adhesive tacky.

The means for pressing the heated film F into sealing engagement with the heated rims 44 of the containers 42 will be best understood from FIGS. 5 and 9. A pair of support lugs 396 extend upwardly upon frame members 88 and 90, and lugs 396 include upwardly opening notches 398. A horizontally extending transverse shaft 400 is seated within notches 398, and a pair of spaced longitudinally extending arms 402 are fixed to shaft 440 by nuts 404. A shaft 406 is rotatably mounted between arms 402 at the end thereof opposite from shaft 400, and a plurality of rollers 408 are carried upon shaft 406, one roller 408 being provided for each container 42 in the transverse rows of containers. As is evident from FIG. 9, rollers 408 are positioned in film pressing relationship with respect to the film F and the containers 42, to press the heated film into sealing engagement with the preheated rims 44 of the containers 42. Rollers 408 are preferably formed of a somewhat resilient, hardened rubber material, which press the film into engagement with the container rims 44 with a firm, yet yielding force. The rollers 408 are separated from one another by diametrically enlarged discs 410, which force the film F downwardly at opposite sides of each container 42 to assist in the sealing action. Means is provided for adjusting the force of the rollers 408 against the containers 42, and to this end, a rod 412 is secured between a flange 414 on mounting bracket 374 and an enlargement 416 (FIG. 5) on one arm 402 with a wing nut 418 being provided on an externally threaded lower portion 420 of rod 412 to vary the position of arms 402 relative to the conveyor 50.

Figure 11:
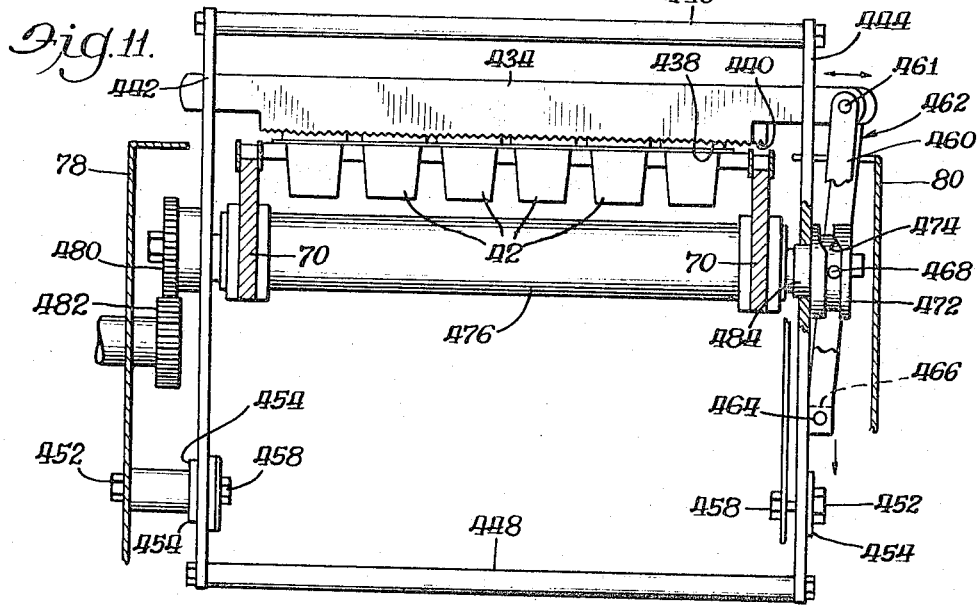
FIG. 11 is a cross-sectional view taken generally along line 11—11 of FIG. 10.
Figure 12:
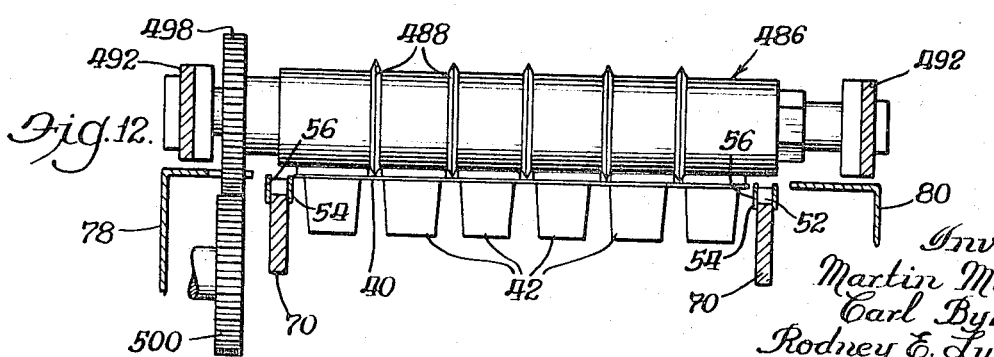
FIG. 12 is a cross-sectional view taken generally along line 12—12 of FIG. 10.

After the film F has been bonded to the containers 42, the conveyor 50 transports the containers to the transverse slitting station 32 and the longitudinal slitting station 34, the structure of which will be best seen in FIGS. 10–12. Before the containers reach the transverse slitting station, a relatively heavy metal cooling roll 424 (FIG. 10) that is rotatably journaled at 428 between a pair of spaced arms 426, bears against the film to set the bond between the film F and the container rims. Arms 426 are pivotally mounted at 432 on lugs 430 that extend upwardly from frame members 88 and 90.

The transverse slitting means is defined by a pair of face abutting knife elements 434 and 436, having serrated bottom knife edges 438 and 440, respectively. Blades 434 and 436 have reduced end portions that are slidably received in elongate, vertically movable mounting arms 442 and 444, the upper and lower ends of which are connected by transversely extending horizontal rods 446 and 448. Mounting arms 442 and 444 include an elongate slot 450 adjacent the lower end thereof, and guide blocks 454 are fixed to the frame by bolts 452 and nuts 458. Blocks 454 have a reduced portion pivotally mounted on bolts 452 and slidably positioned in slots 450, to guide arms 442 and 444 in their vertical movement.

Knives 434 and 436 are actuated by arms 460 and 462, respectively, the upper end of arm 460 being pivotally secured at 461 to the end of knife 434, and the upper end of arm 462 being pivotally secured at 463 to the end of knife 436. As is evident from FIG. 10, the lower ends of arms 460 and 462 are laterally offset, with the lowermost end of each of the arms being pivotally connected at 464 to a block 466 that is secured to arm 444. The intermediate portion of arms 460 and 462 have respective cam followers 468 and 470 thereon which rides in an outwardly opening, circumferentially extending cam track 474 of a cam 472. Cam track 474 includes a laterally offset portion that is movable sequentially into engagement with cam follower rollers 468 and 470 for pivoting arms 460 and 462 to reciprocate the knife elements 434 and 436 relative to one another.

The means for rotating cam 472 includes a shaft 476 (FIG. 11) that is rotatably journaled in frame elements 70, and which is rotated through a drive system including gears 480 and 482, as will hereinafter appear. Cam 472 includes a hub 484 that is rotatably journaled in an opening in arm 444, and hub 484 is positioned in eccentric relationship around the reduced end portion of shaft 476. Thus, as the shaft 476 is rotated, the eccentric portion 484 of cam 472 will pivot arms 442 and 444 back and forth and lower and raise knives 434 and 436 from a clearance position above the film allowing the containers 42 to pass therebeneath to a cutting position in engagement with the film. The drive to shaft 476 is synchronized with the movement of conveyor 50, so that the knives 434 and 436 will be lifted and moved backward to a position above the film between the next succeeding row of containers in timed relationship, after the transverse severing of the film has been completed, and then lowered to travel forwardly in cutting relationship with the film.

The longitudinal film slitting means includes a transversely extending roll 486 having a plurality of outwardly extending knives 488 thereon. As is evident from FIG. 12, knives 488 are spaced between the rows of containers 42 so as to sever the film therebetween. The outer ends of roll 488 are pivotally mounted at 490 in a pair of longitudinally extending arms 492 that are pivotally connected at 494 to lugs 496 which extend upwardly from frame members 88 and 90. A driven gear 498 is mounted on the shaft of roller 488, and gear 498 is rotated by a drive gear 500 through the drive system to be hereafter described in connection with FIG. 16.

In an alternative arrangement, the separate cooling roll 424 may be eliminated, and in place thereof, a severing roll similar to roll 486 may be rotatably mounted on arms 426, with the roll portions between the cutting blades serving to cool the film and container rims. As with the previous embodiment, a cooling medium, such as cool air, may be blown across the cooling-cutting roll to dissipate the heat picked up from the film F and the containers.

After the film F has been severed longitudinally and transversely, the conveyor 50 transports the tray to the tray removal station 36.

Tray insertion mechanism

Means are provided at the tray removal station 36 for automatically removing the trays from the conveyor 50, for assembling a predetermined number of trays into a stack, and for inserting the stack into a shipping container. Such structure will be best seen from FIGS. 13–15. Referring first to FIG. 13, a pair of spaced arms 502 are mounted upon a transverse shaft 504, which is pivotally mounted upon a frame member 506. A pin 508 extends transversely with respect to the lower ends of arms 502, and a tray moving finger 510 includes a cylindrical sleeve 512 mounted on pin 508. Shaft 504 is oscillated by means to be hereafter described to move arms 502 from the tray pick-up position shown in broken lines in FIG. 13 to the tray transfer position shown in full lines in FIG. 13 for accelerating the leading tray forwardly away from the following trays. A plurality of laterally spaced tray support members 514 are secured to the frame of the apparatus, and are positioned at the level of conveyor 50 between the rows of containers 42, as can be seen in FIG. 14, to receive the trays 40 from the conveyor 50 and to support the trays during movement between the tray pick-up and transfer positions.

The drive to shaft 504 can be seen in FIG. 15, and as illustrated therein, a gear 516 is mounted on shaft 504, with the teeth on gear 516 meshing with a vertical rack 518. Rack 518 is mounted for vertical movement between a pair of spaced guide plates 520 with the lower end of rack 518 having a cam follower 522 thereon, which rides in a cam track 524 in a cam 526. Guide plates 520 are secured to a frame member 528 which also supports the shaft 530 for cam 526. Cam 526 has gear teeth 532 on the outer periphery thereof, which mesh with teeth on a pinion 534 on a shaft 536 that is also mounted for rotation relative to frame member 528. Pinion 534 is rotated by a helical gear 538 that is carried by the main shaft 540 which synchronizes the various functions of the apparatus, as will hereinafter appear.

Cam track 524 has an offset portion 525 therein, so that when the cam is rotated by gears 538 and 534, the rack 518 is reciprocated between the full and broken line positions illustrated in FIG. 15. During the reciprocal movement of rack 518, shaft 504 is oscillated to move the arm 502 between the tray pick-up and the tray transfer positions. A microswitch 542 is positioned adjacent the upper end of rack 518, and microswitch 542 includes a pivotally mounted actuating arm 544 that is engaged by the upper end of rack 518 in response to movement of the rack to its uppermost position to pivot the arm 544 to a switch actuating position. Switch 542 is connected in an appropriate electrical circuit (not shown) with a motor 546 for operating a tray elevating means 548.

The tray elevating means includes a plurality of generally U-shaped laterally spaced (FIG. 14) elevating platforms 549, each having a central bight portion 550 and downwardly extending side portions 552 and 554. The bight portions 550 of the tray elevating platforms 549 are positioned to engage the lower surface of containers 42 in the transfer position to lift the trays into a tray storage means 556 above the tray transfer position.

The side portions 552 and 554 of the platforms 549 are secured to one another by longitudinally extending brace members 565, and the platforms 549 are secured to spaced, vertically disposed lift rods 558 and 560 by fasteners 562 and 564, respectively, which pass through clearance openings in the brace members 565 and which are threaded into connectors 567 and 569 on the upper end of lift rods 558 and 560, respectively. Lift rods 558 and 560 are guided for vertical movement relative to a horizontally disposed frame member 566 by tubular guide sleeves 568 and 570, respectively, which extend downwardly from frame member 566. A crossbar 572 is connected to lift rods 558 and 560 adjacent the lower ends thereof, and crossbar 572 is connected to an eccentric lifting means 574 by a swingably mounted adjustable rod means 576.

Lifting means 574 includes a roller 578 that is provided in the upper end of rod means 576, and roller 578 is mounted upon a stud 579 that extends outwardly from a lifting link 580, that is fixed to the end of a transversely extending shaft 582. Shaft 582 is rotatably supported in a frame member 584 and in a bearing block 586 that is secured to frame member 566 by fasteners 588. The end of shaft 582 that extends through frame member 584 has a gear 590 thereon, which meshes with a gear 592 on the output shaft 594 of motor 546. Thus, when motor 546 is energized in response to the actuation of a switch 542 by rack 518, link 580 rotates to lift crossbar 552 through rod means 576 to move the lift rods 558 and 560 and the platforms 549 upwardly.

As is evident from FIG. 14, the platforms 549 are spaced from one another by a sufficient distance to clear the support members 514, so that when the platforms 549 are elevated, the tray 40 at the tray transfer position is elevated into the storage means 556. A frame member 596 is supported in spaced parallel relationship with frame member 566 by a plurality of vertically disposed elongate support tubes 598, the upper ends of which are secured to frame member 596 by fasteners 595 and the lower ends of which rest upon the upper surfaces of frame members 88 and 90. Support posts 597 are secured between frame members 566 and the lower surfaces of frame members 88 and 90 by fasteners 599, which extend through posts 597, and which are threaded into the lower ends of posts 598. The tray storage means 556 is defined between the frame members 566 and 596, as is evident from FIG. 13.

A pair of spaced tray holding members 600 are spaced from one another slightly in excess of the width of the trays 40 so as to receive the trays therebetween when the platform means 549 are elevated. Holding members 600 are mounted on studs 602 that are fixed to posts 598, and members 600 have openings therein that are slidably received on the end portions of studs 602, with enlarged heads 604 at the ends of the studs serving to retain the members 600 hereon. Springs 606 surround studs 602, and bias members 600 toward one another. The lower ends 608 of members 600 are flared outwardly to guide the trays 40 into the holding means 556. Upwardly tapering, inwardly facing abutments 610 are provided on members 600, with the upper surfaces on opposite abutments 610 being horizontally aligned to define tray support means.

Thus, when the platforms 549 are raised by the elevator means 548, the tray 40 in the transfer station is lifted upwardly, with the outer edges of the tray engaging the lowermost abutments 610 to spread the members 600 outwardly against the bias of springs 606. When the tray 40 clears the lowermost abutments 610, the springs 606 urge the members 600 toward one another, with the tray 40 being supported upon the horizontally aligned upper surfaces of the abutments. As additional trays 40 are lifted by the elevator means 548, the tray that is held by the lowermost abutments 610 is moved upwardly into position to be supported by superjacent abutments.

When a predetermined number of trays 40 are accumulated within the holding means 556, the elevator means 548 shifts the uppermost tray into engagement with sensing means for actuating shifting means to move the accumulated stack of trays out of the holding means. To end, a microswitch 612 (FIG. 14) is mounted upon post 598 adjacent the rearward end of holding means 556. Microswitch 612 includes a spring biased actuating arm 614 that is mounted for pivotal movement between a normal piston shown in broken lines in FIG. 14 and an actuated position shown in full lines in FIG. 14. Microswitch 612 is connected in a suitable circuit (not shown) with a motor 616 for operating a drive means 618 to move a pusher means 620 through the tray storage means 556 to transfer the trays accumulated therein through an open rectangular guide sleeve 622 fixed to the frame of the machine into a shipping carton 624, the open end of which is slidably inserted over sleeve 622.

A tray sensing element 626 controls actuation of microswitch 612, and to this end, sensing element 626 includes a horizontally disposed upper portion 628 which overhangs the storage means 556. Sensing element 626 is mounted for vertical movement relative to posts 598, and includes a rearwardly facing cam 630 having a vertically disposed upper surface 632 and a downwardly inclined lower surface 634. The upper end of actuating arm 614 normally bears against cam surface 632, and when the uppermost tray is accumulated in the storage means 556, sensing member 626 is lifted upwardly so that the switch actuating arm 614 moves into engagement with cam portion 634 to actuate switch 612 and energize motor 616.

Motor 616 includes an output shaft 636 having a sprocket 638 fixed thereon, with an endless chain 640 being trained over sprocket 638 and over a further sprocket 642 supported on frame member 596. Drive means 618 further includes a link 644 connected to chain 642 and to a horizontal plate 646 of pusher means 620. Guide rods 648 are fixed to frame member 596, and sleeves 650 are mounted upon plate 646 and are slidable along rods 648. A pair of spaced, generally triangularly shaped side members 562 extend downwardly from plate 646, and an upright pusher element 654 is fixed to the ends of members 652 and is adapted to sweep across storage means 556 when motor 616 is energized to push the trays in the storage means through chute 622 into carton 624. When motor 616 is energized by the actuation of switch 612 to rotate shaft 636 and sprocket 638, link 644 is rotated by chain 640 to shift the pusher means 620 outwardly through a tray displacing stroke, and then inwardly to the rest position of FIG. 14.

Summary

With reference to FIG. 16, the various functions of the packaging apparatus 20 are synchronized for operation in proper timed sequence by the drive to main shaft 540, which includes a vertical shaft 656 that transmits rotary motion to shaft 540 through gears 658, 660, 662 and 664. Proceeding from left to right on shaft 540, as viewed in FIG. 16, gears 664, 666, 668, 670, 672, 674 and 538 on shaft 540 rotate respective gears 676, 678, 680, 482, 500, 682 and 582 to control, in order cam 174, cam 106, cam 340, transverse cutters 434 and 436, longitudinal cutters 488, driven sprocket 60, and cam 526.

While the process of the present invention is believed to be apparent from the preceding description, the process can be summarized by reference to FIG. 17. After the containers 42 have been assembled into the trays 40 in accordance with step 1 and the teachings of the above-mentioned Ludder application, the trays are stacked upon one another, with the containers thereon internested within one another. When the desired number of trays have been assembled into a stack, the stack is preferably placed in an inner shipping carton 151, and a plurality of inner shipping cartons are inserted in a protective sheath (not shown) such as a plastic bag. The sheath is then inserted in an outer shipping carton, for transportation to the packager, in accordance with step 3. When the packager receives the carton of trays, the outer carton and protective sheath are opened, and an inner carton 151 is placed in magazine M, with the lowermost tray 40 being supported upon plate 153.

When it is desired to initiate the container filling operation, plate 153 is removed and the apparatus 20 is actuated from the control panel 684, with the trays 40 being dispensed one at a time from magazine M onto the conveyor 50 in accordance with step 4. The conveyor 50 initially transports the trays 40 into the sterilizing station 26 (step 5), where hot air is blown into each row of containers 42 through nozzles 228. The containers 42, purged of any impurities, then pass beneath filling nozzles 284 at the filling station 28, which move with the conveyor in an arcuate path to dispense a preselected measure of fluid into each container (step 6).

The conveyor 50 then transports the trays of filled containers to the closure applying station 30, where the heated closure film F is pressed into heat sealing engagement with the preheated rims 44 of the containers, in accordance with step 7. The conveyor functions to pull the film from the film supply, it being understood that a suitable braking device may be provided on film supply shaft 366 to maintain a back tension upon the film F. Conveyor 50 then transports the trays of sealed containers to the transverse slitting station 32 and longitudinal slitting station 34, where step 8 is performed to separate each of the containers 42.

When the trays 40 reach the removal station 36, a predetermined number (six in the illustrated embodiment) of trays are elevated into the storage means 556, and are pushed into a shipping carton 624 in accordance with step 9. The carton is then removed from sleeve 622, repackaged and shipped to the end user (step 10) for use by him (step 11).

From the above, it will be apparent that the entire packaging and shipping process takes place while the containers 42 remain in the carrier trays 40. This not only simplifies the packaging apparatus, but also insures that the containers will remain in a sterile condition, since manual handling of the containers is eliminated.

What is claimed is:

1. A method of packaging a comestible, or like substance, comprising:
   providing a plurality of carriers at a dispensing station;
   moving a conveyor relative to said dipsensing station;
   providing a plurality of containers in interlocking relationship with each carrier;
   placing said carriers one at a time on said conveyor in timed relationship with respect to movement thereof;
   filling said containers while they remain in their respective carrier;
   applying cover structure to said containers while they remain in their respective carrier; and
   removing said carriers one at a time from said conveyor.

2. The method of claim 1 including the further step of sterilizing said containers before they are filled.

3. The method of claim 1 wherein said cover structure is applied by heat sealing a web of cover stock to a plurality of containers in said carrier.

4. The method of claim 3 including the step of cutting said cover stock both transversely and longitudinally so that each container is a separate entity.

5. The method of claim 1 wherein said carrier removing step is performed by transferring a predetermined number of carriers into a storage zone, and shifting said carriers from said storage zone into a shipping container after the predetermined number of carriers have been accumulated.

6. The method of claim 1 wherein a plurality of carriers are stacked in a dispensing magazine, and wherein the carriers are placed one at a time on the conveyor by repeatedly moving a carrier transport mechanism between a pick-up position adjacent the magazine and a depositing position adjacent the conveyor.

7. The method of claim 1 wherein said cover structure is applied by preheating the containers, heating a web of cover stock and pressing the cover stock into heat sealing relationship with the containers.

8. The method of claim 7 including the further step of setting the bond between the film and the containers by pressing a cooling element against the film.

9. Apparatus for packaging liquid comprising:
   conveyor means;
   means for moving said conveyor means;
   means at a dispensing station for holding a plurality of carrier means;
   means for discharging carrier means one at a time onto said conveyor means in timed relationship with respect to movement of the conveyor means;

each carrier means having a plurality of containers releasably interlocked therewith;

means at a filling station for filling said containers with liquid while said containers remain in said carrier means;

means at a cover applying station for covering said filled containers while said containers remain in said carrier means; and means for removing said carrier means from said conveyor.

10. Apparatus for packaging liquid comprising:

conveyor means;

means for continuously moving said conveyor means;

means for discharging carrier means onto said conveyor means at a dispensing station;

each carrier means having a plurality of containers releasably interlocked therewith;

means at a filling station for filling said containers with liquid while said containers remain in said carrier means;

means at a cover applying station for covering said filled containers while said containers remain in said carrier means;

means for synchronizing the discharging means, the filling means and the cover applying means with the conveyor moving means; and means for removing said carrier means from said conveyor.

11. Apparatus as set forth in claim 10 wherein each carrier means is defined by a generally flat tray-like member having a plurality of transversely extending rows of container holding means.

12. Apparatus as set forth in claim 9 including cooperating means on said conveyor means and said carrier means for retaining successively dispensed carrier means adjacent to, and in alignment with, one another.

13. Apparatus as set forth in claim 12 wherein said cooperating means is defined by means forming a plurality of transversely extending slots in said conveyor means, and projections on said carrier means received in said slots.

14. Apparatus as set forth in claim 13 in which the holding means in said tray-like member are defined by openings therein, and wherein said containers extend through said openings to form said projections.

15. Apparatus as set forth in claim 9 including means for sterilizing said containers prior to the filling thereof.

16. Apparatus as set forth in claim 9 including means providing a supply of film at said cover applying station, and means for heat sealing said film to said containers.

17. Apparatus as set forth in claim 16 including means for transversely and longitudinally severing said film to separate said containers.

18. Tray dispensing apparatus for placing trays one at a time on a continuously moving conveyor comprising:

a magazine for holding a stack of container holding trays in spaced parallel relationship;

a tray support assembly mounted for movement between a clearance position spaced from said magazine, a pick-up position adjacent said magazine, and a depositing position adjacent said conveyor;

upper and lower fingers on said transport assembly, said upper fingers being positionable above the lowermost tray in the stack of trays and said lower fingers being positionable below said lowermost tray in the stack of trays in the pick-up position of said transport assembly, said upper and lower fingers supporting said lowermost tray and guiding said lowermost tray into transportable association with said conveyor during movement of said transport assembly from said pick-up position to said depositing position;

means engageable with the lowermost tray for supporting said stack of trays; and means for moving said stack supporting means out of engagement with the lowermost tray when said tray transport assembly is at said pick-up position and for moving said stack supporting means into engagement with the next lowermost tray in said stack as said tray transport assembly moves from said pick-up position toward said depositing position.

19. Tray dispensing apparatus as set forth in claim 18 including means synchronizing movement of said tray transport assembly and stack supporting means with said conveyor.

20. Packaging apparatus comprising:

a continuously movable conveyor;

means for dispensing trays onto said conveyor one at a time from a stack of trays, said trays each having a plurality of containers releasably interlocked therewith;

means for dispensing a predetermined quantity of a product into said containers;

means for applying closures to said containers;

means for accumulating a predetermined number of trays in a storage zone; and means for automatically transferring said trays from said storage zone into a shipping container in response to the accumulation of said predetermined number.

21. Packaging apparatus as set forth in claim 20 wherein said tray storage zone is defined by a plurality of vertically spaced tray holding abutments, with elevator means being positioned below said tray holding abutments for shipping said trays upwardly into supporting engagement therewith.

References Cited

UNITED STATES PATENTS

| | | | |
|---|---|---|---|
| 3,112,590 | 12/1963 | O'Brien | 53—282 |
| 3,119,216 | 1/1964 | Held | 53—39 |
| 3,328,937 | 7/1967 | Newman et al. | 53—282 |
| 3,342,010 | 9/1967 | Henry | 53—37 |

TRAVIS M. McGEHEE, Primary Examiner